United States Patent
Campbell et al.

(10) Patent No.: US 8,390,228 B2
(45) Date of Patent: Mar. 5, 2013

(54) METHODS AND SYSTEMS FOR INDUCTION MACHINE CONTROL

(75) Inventors: Mengwei Campbell, Torrance, CA (US); Bon Ho Bae, Torrance, CA (US); Silva Hiti, Redondo Beach, CA (US); Sibaprasad Chakrabarti, West Midnapur (IN)

(73) Assignee: GM Global Technology Operations LLC, Detroit, MI (US)

( * ) Notice: Subject to any disclaimer, the term of this patent is extended or adjusted under 35 U.S.C. 154(b) by 628 days.

(21) Appl. No.: 12/635,313

(22) Filed: Dec. 10, 2009

(65) Prior Publication Data

US 2011/0140646 A1    Jun. 16, 2011

(51) Int. Cl.
*H02P 7/00* (2006.01)
(52) U.S. Cl. ............ 318/432; 318/434; 318/727
(58) Field of Classification Search .......... 318/727, 318/798, 800, 801, 807, 432, 434
See application file for complete search history.

(56) References Cited

U.S. PATENT DOCUMENTS

| | | | |
|---|---|---|---|
| 4,958,116 A * | 9/1990 | Hirose | 318/800 |
| 5,043,649 A | 8/1991 | Murakami et al. | |
| 5,144,216 A * | 9/1992 | De Doncker | 318/807 |
| 5,334,923 A * | 8/1994 | Lorenz et al. | 318/805 |
| 6,433,506 B1 * | 8/2002 | Pavlov et al. | 318/804 |
| 6,683,428 B2 * | 1/2004 | Pavlov et al. | 318/432 |
| 6,854,881 B2 | 2/2005 | Nada | |
| 6,870,348 B2 | 3/2005 | Mijalkovic et al. | |
| 7,560,895 B2 * | 7/2009 | Arnet | 318/778 |
| 7,570,074 B2 | 8/2009 | Gao et al. | |
| 7,615,951 B2 | 11/2009 | Son et al. | |
| 7,746,013 B2 | 6/2010 | Fernengel et al. | |
| 8,013,565 B2 | 9/2011 | Miura | |
| 8,069,827 B2 | 12/2011 | Watanabe et al. | |

OTHER PUBLICATIONS

United States Patent and Trademark Office, U.S. Office Action dated Mar. 28, 2012 for U.S. Appl. No. 12/568,002.
U.S. Notice of Allowance, dated Aug. 8, 2012, for U.S. Appl. No. 12/784,873.
U.S. Office Action, dated Aug. 16, 2012, for U.S. Appl. No. 12/568,002.
U.S. Ex Parte Quayle Action, dated Sep. 20, 2012, for U.S. Appl. No. 12/778,733.

* cited by examiner

*Primary Examiner* — Rina Duda
(74) *Attorney, Agent, or Firm* — Ingrassia Fisher & Lorenz, P.C.

(57) ABSTRACT

A method for controlling an induction machine having a rotor includes the steps of obtaining a torque command, calculating an estimated squared value of resistance of the rotor using the torque command, determining an offset for the resistance of the rotor, and generating an updated measure of rotor resistance using the estimated squared value and the offset.

20 Claims, 4 Drawing Sheets

METHODS AND SYSTEMS FOR INDUCTION MACHINE CONTROL

TECHNICAL FIELD

The present invention generally relates to the field of induction machines, and, more specifically, to methods and systems for controlling induction machines.

BACKGROUND

Indirect field-oriented control (IFOC) is widely used for induction machines, such as motors of vehicles. For example, IFOC is utilized in some vehicles for three-phase induction machine control in traction application. IFOC can be a valuable tool, for example in using rotor resistance values in estimating torque values for an induction machine, for example of a vehicle. IFOC is commonly used control method for a three-phase induction machine. For example, if induction machine parameters of the IFOC are know, the IFOC reduces the complex dynamics of an induction machine to the dynamics of a separately excited direct current machine. Using this approach allows the flux and torque of the induction machine to be controlled independently.

However, if the parameters used in IFOC are not identical to the actual parameters in the induction machine, the desired machine flux level may not be properly maintained. In addition, because the desired torque is estimated based on the actual parameters, torque linearity may also be lost. For example, it may be difficult to properly maintain decoupling between the flux and torque if less than ideal rotor resistance values are used in the calculation. Thus, rotor resistance values, which are functions of rotor temperature, can have a significant impact on the performance of IFOC. Torque accuracy, response and efficiency can similarly be affected by the accuracy of the values of rotor resistance that are used in the calculations.

Accordingly, it is desirable to provide improved methods for controlling an induction machine, such as for a vehicle, for example that provide improved estimates of rotor resistance that may then be utilized in obtaining improved estimates for motor torque. It is also desirable to provide improved systems for controlling an induction machine, such as for a vehicle, for example that provide improved estimates of rotor resistance that may then be utilized in obtaining improved estimates for motor torque. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for controlling an induction machine having a rotor is provided. The method comprises the steps of obtaining a torque command, calculating an estimated squared value of flux determining an offset for the resistance of the rotor, and generating an updated measure of rotor resistance using the estimated squared value and the offset.

In accordance with another exemplary embodiment, a method for controlling an induction machine having a rotor is provided. The method comprises the steps of obtaining a torque command, determining a position of the rotor, determining a speed of the rotor, calculating an estimated squared value of flux of the rotor using the torque command, the position of the rotor, and the speed of the rotor, determining a flux square offset value for the rotor using the torque command, the speed of the rotor, and a look-up table, and generating an updated measure of rotor resistance using the estimated squared value and the flux square offset value.

In accordance with a further exemplary embodiment, a system for controlling an induction machine having a rotor is provided. The system comprises a first sensor, a second sensor, and a processor. The first sensor is configured to measure a position of the rotor. The second sensor is configured to measure a speed of the rotor. The processor is coupled to the first sensor and the second sensor. The processor is configured to at least facilitate obtaining a torque command, calculating an estimated squared value of flux of the rotor using the torque command, the position of the rotor, and the speed of the rotor, determining a flux square offset value for the rotor using the torque command, the speed of the rotor, and a look-up table, and generating an updated measure of rotor resistance using the estimated squared value and the flux square offset value.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
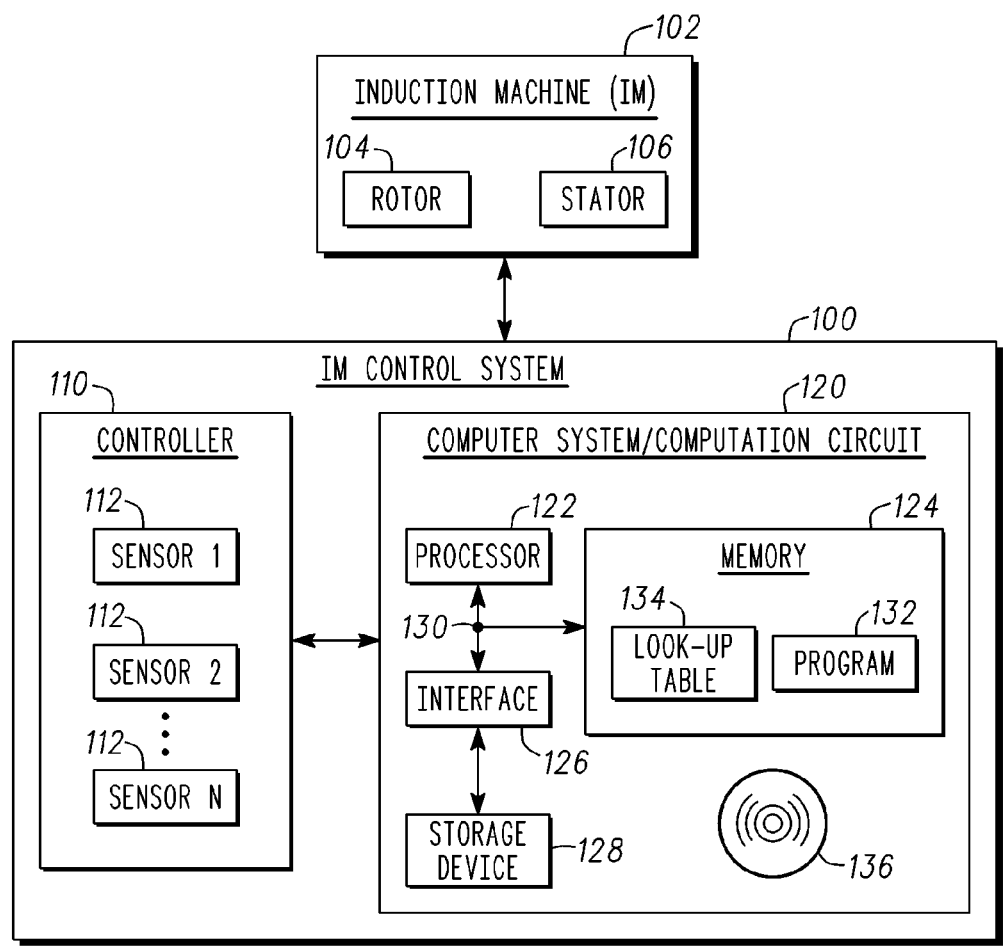
FIG. 1 is a functional block diagram of a system for controlling an induction machine, in accordance with an exemplary embodiment of the present invention.

FIG. 1 is a functional block diagram of a system 100 for controlling an induction machine 102 having a rotor 104 and a stator 106, in accordance with an exemplary embodiment. The system 100 includes a controller 110 and a computer system 120.

The controller 110 includes one or more sensors 112. In a preferred embodiment, one or more of the sensors 112 are configured to measure a position of the rotor 104. Also in a preferred embodiment, one or more additional sensors 112 are configured to measure a speed of rotation of the rotor 104. These measured values can be used in determining an estimated flux value of the rotor 104. The measurements of the sensors 112 and/or information pertaining thereto are provided to the computer system 120 for processing, preferably by the processor 122 thereof.

The computer system 120 is coupled to the controller 110 and to the sensors 112 thereof. In a preferred embodiment, the computer system 120 comprises a computation circuit of the system 100.

In the depicted embodiment, the computer system 120 includes a processor 122, a memory 124, an interface 126, a storage device 128, and a computer bus 130. The processor 122 performs the computation and control functions of the computer system 120 and the system 100, and may comprise any type of processor or multiple processors, single integrated circuits such as a microprocessor, or any suitable number of integrated circuit devices and/or circuit boards working in cooperation to accomplish the functions of a processing unit. During operation, the processor 122 executes one or more programs 132 contained within the memory 124 and, as such, controls the general operation of the computer system 120.

The memory 124 can be any type of suitable memory. This could include the various types of dynamic random access memory (DRAM) such as SDRAM, the various types of static RAM (SRAM), and the various types of non-volatile memory (PROM, EPROM, and flash). Also as depicted in FIG. 1, the memory 124 preferably stores the program 132 for use in executing the steps of various processes such as the process 200 of FIG. 2 discussed further below. Also in a preferred embodiment, the memory 124 stores a look-up table 134 for use in determining adjusted values of rotor flux squared for the rotor 104 of the induction machine 102, also preferably in accordance with the process 200 of FIG. 2 discussed further below. The computer bus 130 serves to transmit programs, data, status and other information or signals between the various components of the computer system 120.

The interface 126 allows communication to the computer system 120, for example from the controller 110, the sensors 112 thereof, a system driver, and/or another computer system, and can be implemented using any suitable method and apparatus. It can include one or more network interfaces to communicate with other systems or components. The interface 126 may also include one or more network interfaces to communicate with technicians, and/or one or more storage interfaces to connect to storage apparatuses, such as the storage device 128.

The storage device 128 can be any suitable type of storage apparatus, including direct access storage devices such as hard disk drives, flash systems, floppy disk drives and optical disk drives. In one embodiment, the storage device 128 comprises a program product from which memory 124 can receive a program 132 that executes one or more embodiments of one or more processes, such as the process 200 set forth further below or portions thereof. In another embodiment, the program product may be directly stored in and/or otherwise accessed by the memory 124 and/or a disk (e.g., disk 136) such as that referenced below.

The computer bus 130 can be any suitable physical or logical means of connecting computer systems and components. This includes, but is not limited to, direct hard-wired connections, fiber optics, infrared and wireless bus technologies. During operation, the program 132 is stored in the memory 124 and executed by the processor 122. It will be appreciated that the system 100 may differ from the embodiment depicted in FIG. 1, for example in that the system 100 may be coupled to or may otherwise utilize one or more remote computer systems and/or other control systems.

It will be appreciated that while this exemplary embodiment is described in the context of a fully functioning computer system, those skilled in the art will recognize that certain of these mechanisms are capable of being distributed as a program product in a variety of forms with various types of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 120 may also otherwise differ from the embodiment depicted in FIG. 1, for example in that the computer system 120 may be coupled to or may otherwise utilize one or more remote computer systems and/ or other control systems.

Figure 2:
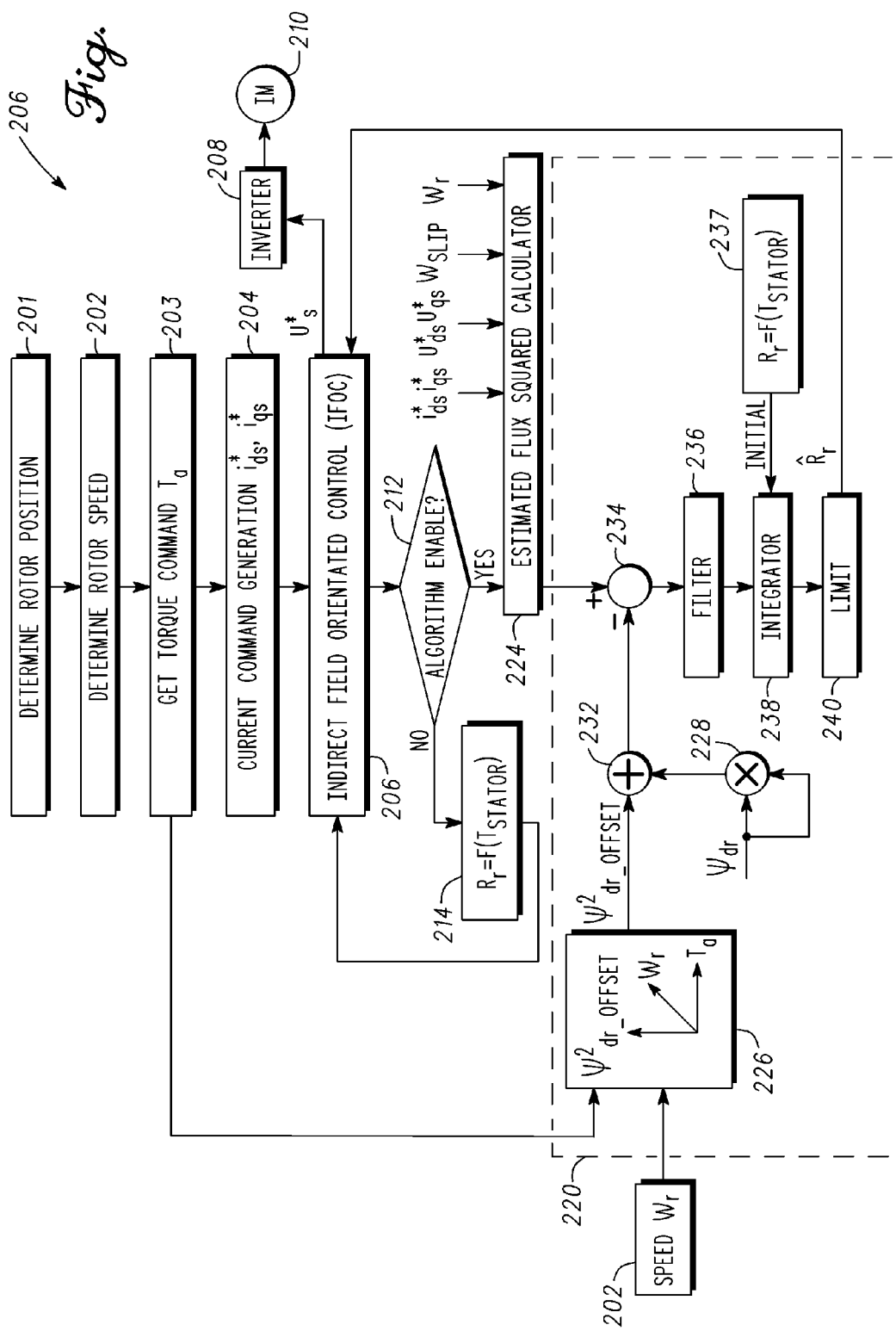
FIG. 2 is a functional block diagram of rotor resistance calculation and correction process using an indirect field oriented control (IFOC) process with model reference adaptive control (MRAC) tuning that employs a square of the rotor flux magnitude to estimate rotor resistance, and that can be used in connection with the system of FIG. 1, in accordance with an exemplary embodiment.

FIG. 2 is a functional block diagram of a rotor resistance calculation and correction algorithm process 200 with model reference adaptive control (MRAC) tuning that employs a square of the rotor flux magnitude to estimate rotor resistance, in accordance with an exemplary embodiment. The process 200 can be used in connection with the system 100 of FIG. 2, also in accordance with an exemplary embodiment.

As depicted in FIG. 2, a rotor position is determined (step 201). In one embodiment, the rotor position is measured by one of the sensors 112 of the controller 110 of FIG. 1 with respect to the rotor 104 of FIG. 1. In another embodiment, the rotor position is calculated by the processor 122 of the computer system 120 of FIG. 1 using information obtained by one of the sensors 112 of the controller 110 of FIG. 1 with respect to the rotor 104 of FIG. 1.

A rotor speed $\omega_r$ is determined (step 202). In one embodiment, the rotor speed is measured by one of the sensors 112 of the controller 110 of FIG. 1 with respect to the rotor 104 of FIG. 1. In another embodiment, the rotor speed is calculated by the processor 122 of the computer system 120 of FIG. 1 using information obtained by one of the sensors 112 of the controller 110 of FIG. 1 with respect to the rotor 104 of FIG. 1.

In addition, a torque command is received (step 203). In a preferred embodiment, the torque command is received by the processor 122 of the computer system 120 of FIG. 1 from the induction machine 102 of FIG. 1.

A current command is then generated (step 204). In a preferred embodiment, the current command is generated using the torque command. In a preferred embodiment, the current command is generated by the processor 122 of the computer system 120 of FIG. 1 as a function of the torque command of step 203.

The torque command produces stator current command components $i^*_{ds}$ and $i^*_{qs}$, respectively, which are provided to the processor 122 of FIG. 1 for processing in accordance with IFOC 206 (also referred to herein as step 206 or algorithm 206). The IFOC 206 outputs reference voltages $v_a$, $v_b$, and $v_c$, and a slip angle $\omega_{slip}$, which are fed to a power inverter 208 of an induction machine 210. In a preferred embodiment, the induction machine 210 corresponds with the induction machine 102 of FIG. 1.

Figure 7:
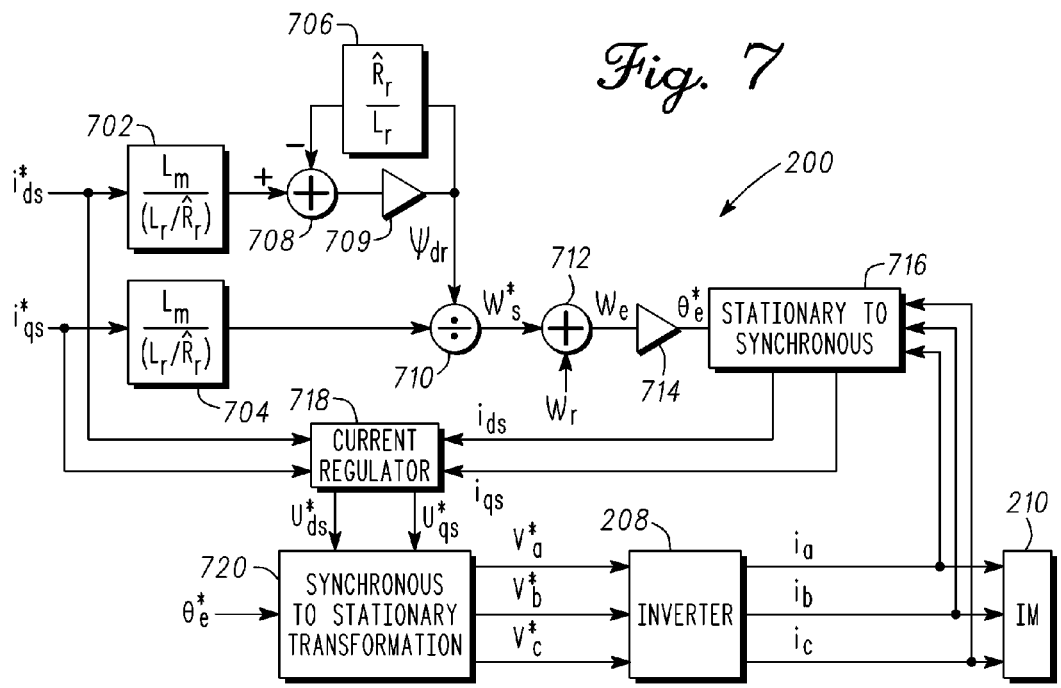
FIG. 7 is a functional block diagram of an IFOC sub-process of the rotor resistance calculation and correction process of FIG. 7, in accordance with an exemplary embodiment.

With reference to FIG. 7, an exemplary IFOC 206 for the rotor resistance calculation and correction process 200 of FIG. 2 is depicted, in accordance with an exemplary embodiment. In the embodiment of FIG. 7, the IFOC 206 utilizes a current regulator 718. Also as depicted in FIG. 7, the IFOC 206 utilizes the commanded value for stator current components $i^*_{ds}$ and $i^*_{qs}$, along with estimated rotor resistance $R_r$ and mutual inductance $L_m$ values to calculate a slip angle $\omega_{slip}$ (also referenced in FIG. 7 as $\omega^*_s$) and a flux angle $\theta^*_e$ (steps 702-714). The flux angle $\theta^*_e$, along with current component values $i_a$, $i_b$, and $i_c$, are transformed from a stationary reference frame to a synchronous reference frame in order to generate updated stator current components $i_{ds}$ and $i_{qs}$ (step 716). The updated stator current components $i_{ds}$ and $i_{qs}$ are provided to the current regulator 718 to generate updated voltage commands and transformed from the synchronous reference frame back to the stationary reference frame to generate the IFOC 206 outputs reference voltages $v_a$, $v_b$, and $v_c$ (step 720). The reference voltages $v_a$, $v_b$, and $v_c$ can then be supplied to the inverter 208 of FIG. 2 for use in controlling the induction machine 210 of FIG. 2. In a preferred embodiment, these calculations and processing are performed by the processor 122 of FIG. 1.

Returning now to FIG. 2, a determination is made as to whether a rotor resistance correction algorithm 220 should be implemented (step 212). For example, in one preferred embodiment, if a speed of the rotor is in a very high range (for example, above 10,000 revolutions per minute, by way of example only), or if a torque of the induction machine is lower than a predetermined amount (such as five percent of a maximum torque of the induction machine, by way of example only), then the rotor resistance correction algorithm is not implemented, and the rotor resistance is calculated instead in accordance with step 214 of FIG. 2 as a function of the stator temperature. In one preferred embodiment, the rotor resistance is calculated in step 214 using the following equation:

$$R_r = R_{r25}*(+0.00399(T_{temp\_stator}-25)) \quad \text{(Equation 1)},$$

in which $R_r$ represents the rotor resistance, $R_{r25}$ represents the rotor resistance at room temperature. $T_{temp\_stator}$ represents the temperature of the stator, and $R_r$ is a function of $T_{temp\_stator}$. In other embodiments, different equations may be used.

Conversely, if it is determined in step 212 that the rotor resistance correction algorithm 220 should be implemented, then the process proceeds to step 224, as described below. As depicted in FIG. 2, in a preferred embodiment rotor resistance correction algorithm comprises steps 224-240 of FIG. 2 and as described below, in accordance with one exemplary embodiment. After the rotor resistance correction algorithm 220 is complete, an updated rotor resistance value is provided (preferably to the processor 122 of FIG. 1) for use in the IFOC 206 of FIG. 2. These steps preferably repeat until there is a determination in the above-described step 212 that the rotor resistance correction algorithm 220 should not be implemented.

During step 224, an estimated rotor flux magnitude $\hat{\psi}_r^2$ is calculated in the IFOC 206 using internal variables (step 224). In a preferred embodiment, a calculating circuit (preferably the processor 122 of FIG. 1) calculates an estimated rotor flux magnitude from measured quantities, including voltages $v_a$, $v_b$, and $v_c$, the rotor slip angle $\omega_{slip}$ from the IFOC calculations of step 206, the phase currents $i_a$, $i_b$, and $i_c$, and the rotor speed $\omega_r$. This information is preferably provided to a processor (most preferably the processor 122 of FIG. 1) as part of a rotor resistance correction algorithm 220. In addition, in a preferred embodiment, the induction machine 210 of FIG. 2 comprises the induction machine 102 of FIG. 1.

In a preferred embodiment, the calculations and processing of step 224 are made by the processor 122 of FIG. 1 using information provided to the processor 122 by one or more of the sensors 112 of FIG. 1, and pertains to the rotor 104 of the induction machine 102 of FIG. 1. In a preferred embodiment, the information as to the estimated squared rotor flux magnitude calculation is obtained and actual rotor flux magnitude is calculated by, the processor 122 of FIG. 1.

Also in a preferred embodiment, during step 224 these calculations are performed in synchronous frame in which the currents appear to be dc in steady state. In order to reduce or eliminate noise content in the actual current signals commanded currents are used in equation (2) instead of the measured currents. This helps to reduce or avoid amplification of the noise in the actual implementation in this embodiment.

Specifically, in this exemplary embodiment, the estimated motor flux square $\hat{\psi}_r^2$ is obtained by the following equation:

$$\hat{\psi}_r^2 = \qquad \text{(Equation 2)}$$
$$\left\{(V_q i_d - V_d i_q) - L_s\sigma\left(i_d\frac{d}{dt}i_q - i_q\frac{d}{dt}i_d + \omega_e i_d^2 + \omega_e i_q^2\right)\right\}\frac{L_r}{\omega_e},$$

in which $V_d$ and $V_q$ are stator commanded voltages in a synchronous reference frame, $i_d$ and $i_q$ are stator currents in a synchronous frame (e.g., in which commanded currents are preferably used), $L_s\sigma$ is an equivalent stator leakage inductance, $L_r$ is rotor leakage inductance, and $\omega_e$ is stator electrical frequency.

In a preferred embodiment, this estimated rotor flux squared tracks the actual flux squared. This flux is preferably calculated inside the IFOC 206 by using a flux observer, for example using one or more of the sensors 112 of FIG. 2. Also in a preferred embodiment, the motor flux from flux observer is calculated as follows:

$$\frac{L_r}{R_r}\frac{d\psi_{dr}}{dt} = -\psi_{dr} + L_m i_d \qquad \text{(Equation 3)}$$

In a preferred embodiment, if $R_r$ is the actual rotor resistance and estimated fluxes from Equations (2) and (3) reflect the motor flux perfectly, then the $\hat{\psi}_r^2$ value in Equation (2) should be equal to the $\psi_{dr}^2$ value in Equation (3). However, mutual inductance $L_m$ changes significantly with the machine saturation level. Accordingly, the $\hat{\psi}_r^2$ value in Equation (2) is parameter sensitive. In addition, leakage inductance variation with machine operation may also affect the accuracy of the value for $\hat{\psi}_r^2$. Accordingly, even though the correct is used, there is still an offset between $\hat{\psi}_r^2$ and $\psi_{dr}^2$. This offset will cause an error in $R_r$ estimation, and therefore will be accounted for in steps 226-240 below with reference to the look-up table.

In addition, a rotor flux square offset value $|\psi_r|^2$ is calculated (step 226). In a preferred embodiment, the rotor flux square offset value $|\psi_r|^2$ is calculated using the rotor speed $\omega_r$ from step 202 and a flux-squared look-up table. Also in a preferred embodiment, the flux squared look-up table is calculated off-line using actual rotor resistance values. Also in a preferred embodiment, the values in the look-up table are a function of torque and speed of the rotor. The flux square offset preferably helps to account for any expected differences between the estimated rotor flux squared and the actual rotor flux squared in light of the actual rotor resistance. In a preferred embodiment, these calculations and processing are conducted by the processor 122 of FIG. 1. Also in a preferred embodiment, the look-up table comprises the look-up table 134 of FIG. 1, and is stored in the memory 124 of FIG. 1.

In addition, a value of actual rotor flux $\psi_{dr}$ is obtained from the IFOC 206 using equation (3) and multiplied by itself (step 228). In a preferred embodiment, this calculation and processing is conducted by the processor 122 of FIG. 1. The squared value $\psi^2_d$, of step 228 is then added to the flux square offset value $|\psi_r|^2$ of step 226, to thereby generate a summed value (step 232). In a preferred embodiment, this calculation is also conducted by the processor 122 of FIG. 1.

Next, in step 234, a difference is calculated between the summed value of step 232 is then subtracted form the estimated flux square value $\psi_{dr}^2$ from step 224. This difference is preferably calculated by a computation circuit, and most preferably by the processor 122 of FIG. 1. The output of this difference is used (preferably by the processor 122 of FIG. 1) in determining the rotor resistance value $R_r$ that is used in the IFOC 206. Because the function $(|\psi_r|^2)$ is sensitive to the rotor resistance $R_r$, any difference between the actual $R_r$ value and the estimated $R_r$ value produces a non-zero error. The non-zero error forces the $R_r$ value used in the IFOC 206 to change.

The difference calculated in step 234 is then processed via a filter (preferably a low-pass filter) (step 236), an integrator (preferably initialized with an initial rotor resistance value as a function of the stator temperature) (step 238), and a limit function or algorithm (preferably, incorporating known temperature limits for the induction machine 210 (step 240) in order to determine a new value for rotor resistance magnitude for use in the IFOC 206 of FIG. 2. In a preferred embodiment, these steps are also conducted by the processor 122 of FIG. 1.

Figure 3:
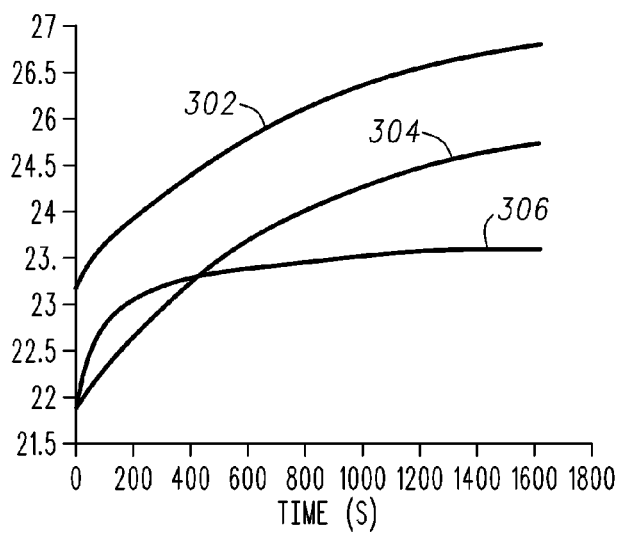
FIG. 3 is a plot showing graphical results pertaining to experiments conducted using some of the exemplary embodiments for estimating rotor resistance and controlling induction machines without using a flux squared lookup table in accordance with the process of FIG. 2 and the system of FIG. 1 under a first set of conditions, in accordance with an exemplary embodiment.

Turning now to FIGS. 3-6, plots are provided of graphical results pertaining to experiments conducted using some of the exemplary embodiments for estimating rotor resistance and controlling induction machines under various conditions. First, FIG. 3 represents an experiment in which the experiment result of the actual motor rotor resistance 302 (calculated by measured rotor temperature), estimated rotor resistance 304, and rotor resistance estimated from stator temperature at steady state 306 (2000 rpm and 10 nm) without using compensated flux squared offset in motoring operation. The relative error between actual rotor resistance and estimated rotor resistance is $$|R_{r-measure} - R_{r-est}| / R_{r-measure} = 4.2\%.$$

Figure 4:
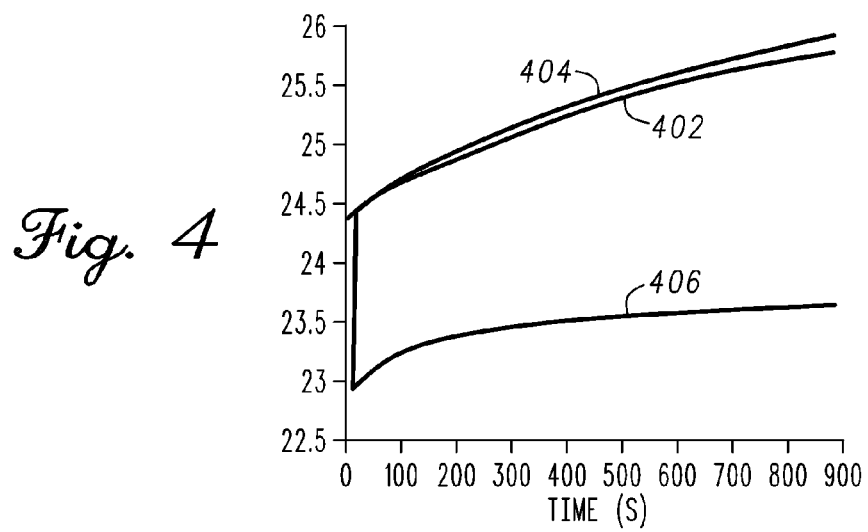
FIGS. 4-6 are plots showing graphical results pertaining to experiments conducted using some of the exemplary embodiments for estimating rotor resistance and controlling induction machines using a flux squared lookup table in accordance with the process of FIG. 2 and the system of FIG. 1 under various conditions, in accordance with an exemplary embodiment.

FIG. 4 shows the experiment result of the actual motor rotor resistance 402, estimated rotor resistance 404, and rotor resistance estimated from stator temperature at steady state 406 (2000 rpm and 10 nm) with compensated flux square offset in motoring operation. The relative error between actual rotor resistance and estimated rotor resistance is within 0.5% at this operation point. This is a significant improvement over the results that are presented in FIG. 3.

Figure 5:
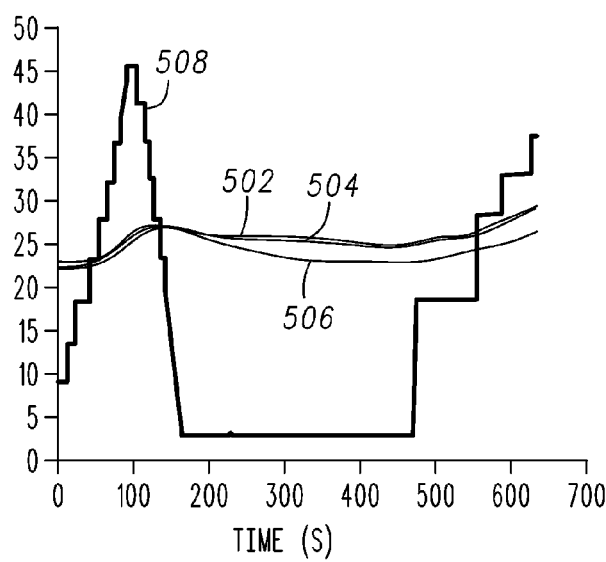
Figure 6:
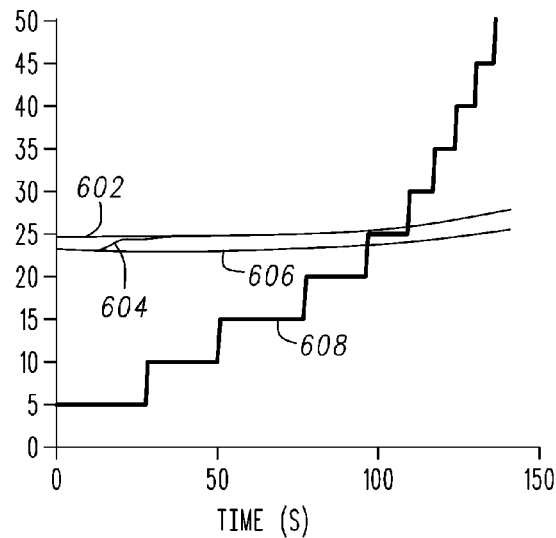

FIG. 5 and FIG. 6 show the experiment results of the actual motor rotor resistance (502 and 602, respectively), estimated rotor resistance (504 and 604, respectively), and rotor resistance estimated from stator temperature (506 and 606, respectively) at 2000 rpm with varying torque command (508 and 608, respectively) with compensated flux square offset in motoring and regeneration operation respectively. Observation on these results shows that the estimated rotor resistance follow the actual rotor resistance very closely not only in steady state but also in transient.

The disclosed methods and systems provide for improved estimation of rotor resistance in induction motors and for improved control of induction motors. For example, the disclosed methods and systems provide for potentially more accurate estimation and control of rotor resistance of induction motors. The disclosed methods and system also allow such estimation and control of rotor resistance of induction motors using potentially less expensive sensors and/or other equipment, and/or allows for such estimation and control of rotor resistance of induction motors to be conducted more quickly and/or more cost effectively. In addition, the disclosed methods and system potentially provide such estimation and control of rotor resistance of induction motors that are reliable in both steady state and transient conditions.

It will be appreciated that the disclosed method and systems may vary from those depicted in the Figures and described herein. For example, as mentioned above, certain elements of the system 100 of FIG. 1, such as the controller 110 and/or the computer system 120 and/or portions or components thereof, may vary, and/or may be part of and/or coupled to one or more other systems and/or devices. In addition, it will be appreciated that certain steps of the process 200 and/or various steps, components, algorithms, and/or sub-algorithms thereof may vary from those depicted in FIG. 2 and/or described herein in connection therewith. It will similarly be appreciated that the disclosed methods and systems may be implemented and/or utilized in connection with various different types of automobiles, sedans, sport utility vehicles, trucks, and/or any of a number of other different types of vehicles and/or other types of devices.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling an induction machine having a rotor, the method comprising the steps of:
   obtaining a torque command;
   calculating an estimated squared value of flux of the rotor using the torque command;
   determining an offset for the resistance of the rotor;
   generating an updated measure of rotor resistance using the estimated squared value and the offset; and
   generating a control signal for the induction machine based on the updated measure.

2. The method of claim 1, wherein the step of determining the offset comprises the step of determining the offset using a look-up table.

3. The method of claim 2, wherein the step of determining the offset comprises the step of determining the offset using the torque command and the look-up table.

4. The method of claim 3, further comprising:
   obtaining a speed of the rotor;
   wherein the step of determining the offset comprises the step of determining the offset using the speed of the rotor, the torque current command, and the look-up table.

5. The method of claim 4, wherein the step of calculating the estimated squared value comprises the step of calculating the estimated squared value using the speed of the rotor.

6. The method of claim 5, further comprising the step of:
determining a position of the rotor;
wherein the step of calculating the estimated squared value comprises the step of calculating the estimated squared value using the speed of the rotor and the position of the rotor.

7. The method of claim 1, wherein the offset comprises a flux square offset value.

8. The method of claim 7, further comprising the steps of:
calculating an estimated value of the flux of the rotor;
wherein the step of generating the updated measure of rotor resistance comprises the step of generating the updated measure of rotor resistance using the estimated squared value, the estimated value, and the flux square offset value.

9. The method of step 8, further comprising the step of:
multiplying a value of actual rotor flux by itself, to generate a multiplied value;
wherein the step of generating the updated measure of rotor resistance comprises the step of generating the updated measure of rotor resistance using the estimated squared value, the multiplied value, and the flux square offset value.

10. The method of step 9, further comprising the step of:
adding the multiplied value to the flux squared offset value, to generate a sum value;
wherein the step of generating the updated measure of rotor resistance comprises the step of generating the updated measure of rotor resistance using the estimated squared value and the sum value.

11. The method of step 10, further comprising the step of:
calculating a difference between the sum value and the estimated squared value;
wherein the step of generating the updated measure of rotor resistance comprises the step of generating the updated measure of rotor using the difference.

12. The method of claim 1, wherein the induction machine also includes a stator, and the method further comprises the steps of:
determining whether an algorithm is enabled;
generating the updated measure of rotor resistance using the estimated squared value and the offset if the algorithm is enabled; and
generating the updated measure of rotor resistance using a temperature of the stator if the algorithm is not enabled.

13. A method for controlling an induction machine having a rotor, the method comprising the steps of:
obtaining a torque command;
determining a position of the rotor;
determining a speed of the rotor;
calculating an estimated squared value of flux of the rotor using the torque command, the position of the rotor, and the speed of the rotor;
determining a flux square offset value for the rotor using the torque command, the speed of the rotor, and a look-up table;
generating an updated measure of rotor resistance using the estimated squared value and the flux square offset value; and
generating a control signal for the induction machine based on the updated measure.

14. The method of claim 13, further comprising the steps of:
calculating an estimated value of the flux of the rotor;
wherein the step of generating the updated measure of rotor resistance comprises the step of generating the updated measure of rotor resistance using the estimated squared value, the estimated value, and the flux square offset value.

15. The method of step 14, further comprising the steps of:
multiplying a value of actual rotor flux by itself, to generate a multiplied value;
adding the multiplied value to the flux squared offset value, to generate a sum value; and
calculating a difference between the sum value and the estimated squared value;
wherein the step of generating the updated measure of rotor resistance comprises the step of generating the updated measure of rotor using the difference.

16. The method of claim 15, wherein the induction machine also includes a stator, and the method further comprises the steps of:
determining whether an algorithm is enabled;
generating the updated measure of rotor resistance using the estimated squared value and the flux squared offset value if the algorithm is enabled; and
generating the updated measure of rotor resistance using a temperature of the stator if the algorithm is not enabled.

17. A system for controlling an induction machine having a rotor, the system comprising:
a first sensor configured to measure a position of the rotor;
a second sensor configured to measure a speed of the rotor; and
a processor coupled to the first sensor and the second sensor, the processor configured to at least facilitate:
obtaining a torque command;
calculating an estimated squared value of flux of the rotor using the torque command, the position of the rotor, and the speed of the rotor;
determining a flux square offset value for the rotor using the torque command, the speed of the rotor, and a look-up table; and
generating an updated measure of rotor resistance using the estimated squared value and the flux square offset value,
generating a control signal for the induction machine based on the updated measure.

18. The system of claim 17, further comprising:
a memory coupled to the processor and configured to store the look-up table.

19. The system of claim 17, wherein the processor is further configured to at least facilitate:
calculating an actual value of the flux of the rotor
multiplying the actual value by itself, to generate a multiplied value;
adding the multiplied value to the flux squared offset value, to generate a sum value;
calculating a difference between the sum value and the estimated squared value; and
generating the updated measure of rotor using the difference.

20. The system of claim 19, wherein the induction machine also includes a stator, and the processor is further configured to at least facilitate:
determining whether an algorithm is enabled;
generating the updated measure of rotor resistance using the estimated squared value and the flux squared offset value if the algorithm is enabled; and
generating the updated measure of rotor resistance using a temperature of the stator if the algorithm is not enabled.

* * * * *